(12) United States Patent
Mohr

(10) Patent No.: US 8,352,579 B2
(45) Date of Patent: Jan. 8, 2013

(54) GATEWAY SERVER SYSTEM COMPRISING A GATEWAY SERVER FOR MAKING SOAP/XML-BASED WEB SERVICES ACCESSIBLE TO RPC CLIENTS

(75) Inventor: Thomas Ludwig Mohr, Babenhausen (DE)

(73) Assignee: Software AG, Darmstadt (DE)

( * ) Notice: Subject to any disclaimer, the term of this patent is extended or adjusted under 35 U.S.C. 154(b) by 649 days.

(21) Appl. No.: 12/458,794

(22) Filed: Jul. 22, 2009

(65) Prior Publication Data

US 2010/0312863 A1 Dec. 9, 2010

(30) Foreign Application Priority Data

Jun. 5, 2009 (EP) ..................................... 09162012

(51) Int. Cl.
*G06F 15/16* (2006.01)
(52) U.S. Cl. ......... 709/220; 709/230; 709/246; 719/330
(58) Field of Classification Search .................... 709/220
See application file for complete search history.

(56) References Cited

U.S. PATENT DOCUMENTS

| | | | | |
|---|---|---|---|---|
| 2005/0262225 | A1* | 11/2005 | Halpern et al. | ............... 709/220 |
| 2007/0083524 | A1 | 4/2007 | Fung et al. | |
| 2007/0204279 | A1* | 8/2007 | Warshavsky et al. | ......... 719/330 |
| 2008/0034367 | A1* | 2/2008 | Patrick et al. | .................. 718/101 |
| 2008/0140861 | A1 | 6/2008 | Kothari et al. | |
| 2008/0281833 | A1* | 11/2008 | Cain et al. | ...................... 707/100 |
| 2009/0006637 | A1* | 1/2009 | George et al. | ................. 709/230 |
| 2009/0313335 | A1* | 12/2009 | Heidasch | ....................... 709/206 |
| 2010/0198948 | A1* | 8/2010 | Yang et al. | ..................... 709/222 |

FOREIGN PATENT DOCUMENTS

WO   WO 2006/045402   5/2006

OTHER PUBLICATIONS

On the Code Development Paradigm of RPC and CORBA Applications; Chu et al., Elsevier Science Publishers BV, vol. 21, No. 3, pp. 267-278.

* cited by examiner

*Primary Examiner* — Brian P Whipple
*Assistant Examiner* — Natisha Cox
(74) *Attorney, Agent, or Firm* — Nixon & Vanderhye PC

(57) ABSTRACT

Certain example embodiments concern a gateway server system including a gateway server for making at least one SOAP and/or XML-based web service accessible to at least one RPC client using at least one mapping file. The at least one mapping file includes definitions for translating at least one first RPC request message from the at least one RPC client to at least one web service call. The gateway server includes a configuration interface to receive and store the at least one mapping file. The gateway server is configured to create at least one first sub-program for processing the at least one first RPC request message in accordance with the at least one mapping file. The configuration interface is further configured to receive at least one updated mapping file and overwrite the corresponding at least one stored original mapping file, without affecting the processing of the at least one first subprogram.

17 Claims, 5 Drawing Sheets

Figure 1:
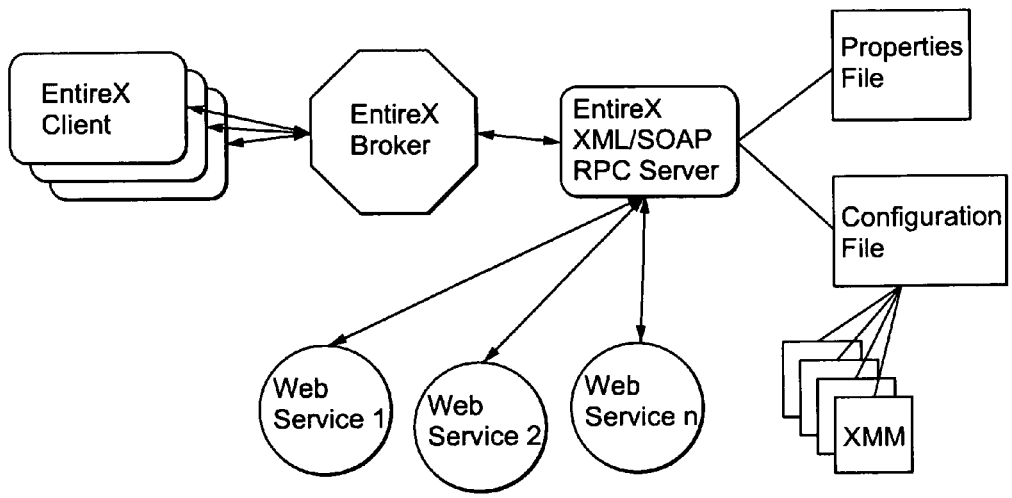

GATEWAY SERVER SYSTEM COMPRISING A GATEWAY SERVER FOR MAKING SOAP/XML-BASED WEB SERVICES ACCESSIBLE TO RPC CLIENTS

This application claims priority to European Patent Application No. 09162012.0 filed 5 Jun. 2009, the entire contents of which is hereby incorporated by reference.

1. TECHNICAL FIELD

The present invention relates to a gateway server system comprising a gateway server for making SOAP/XML-based web services accessible to RPC clients and a corresponding method.

2. THE PRIOR ART

Modern computing environments typically comprise a plurality of distinct computers connected within a network, wherein the participating computers can be broadly classified into client and server computers. A server in this context is a computer that provides certain functionality to another computer, called a client. A server may e.g. provide data to the client as a result of the processing of a computer program on the server itself and/or may itself request functionality of a further server (in so-called multi-tier architectures). In order for a client to invoke a program on the server, the client may communicate with the server over a Remote Procedure Call (RPC) protocol. Furthermore, more and more modern servers offer their functionality in the form of services, such as web services, which can be accessed by clients using SOAP and/or XML-based protocols. Web services are nowadays commonly employed in the context of Service-oriented Architectures (SOA).

However, clients designed for using an RPC-based protocol are typically not compatible with servers providing SOAP/XML-based web services. It is therefore known to provide gateway servers as intermediaries between clients and servers, wherein a gateway server translates the RPC calls from the clients into a format processable by the SOAP/XML-based web services of the servers and vice-versa. An example of such a gateway server is the EntireX XML/SOAP RPC Server of Applicant.

However, using such a gateway server introduces a number of difficulties. Typically, a gateway server has to maintain a number of configuration files for determining which servers (and their provided web services) are supported by the gateway server, which communication protocols are supported and how the translation between these communication protocols should be performed. Typical gateway servers employ a so-called start-up configuration, i.e. when the gateway server is started, it reads its configuration files once and facilitates the communication between clients and servers according to the configuration files read during start-up. This has the disadvantage that changing the configuration of a gateway server requires stopping the gateway server, editing the configuration files and restarting the gateway server. Especially in the context of SOAs and SOAP/XML-based web services, which are intended to be loosely-coupled, dynamically discovered and accessed by clients during runtime, a gateway server using start-up configuration is not feasible, since it would lead to situations where a web service is inaccessible as long as the gateway server is stopped.

In a different context, namely grid computing, i.e. the interconnecting of possibly thousands of commodity computers for computing highly complex scientific or technical computations, the US 2007/0061277 A1 proposes a grid service deployment system for dynamic deployment of grid services over a computer network. However, the grid service deployment system is focused on dynamically deploying new instances of grid services in order to cope with the excessive computation power requirements and does not help in the context of gateway servers translating between clients and servers as presented above, in particular not in the context of RPC calls and SOAP/XML-based web services.

A further challenge is the actual editing of the configuration of a gateway server. This aspect typically requires manually editing the related configuration files, which introduces the risk of easily inserting erroneous configuration settings that may lead to the gateway server being unable to restart or, even worse, to corrupted messages communicated by the gateway server, which result in to severe damages of connected systems and databases.

In this context, the US 2005/0268238 A1 discloses an application server configuration tool comprising a graphical user interface for displaying and editing the configuration of an application server in a structured manner. However, the application server configuration tool does not help in avoiding that an administrator performs erroneous configuration changes.

Lastly, editing the configuration files of a gateway server typically requires that an administrator logs into the local machine on which the gateway server runs in order to access the configuration files, wherein in the worst case the administrator has to be physically present at the machine. Furthermore, the administrator has to have an in-depth knowledge of the configuration file structure on the local machine. On the other hand, providing some sort of remote access to the configuration files of a gateway server introduces severe security risks, since typically an additional configuration port has to be kept open at the gateway server in order to accept incoming remote configuration requests. Such an additional port may be easily used by hackers in order to break into the gateway server.

In view of the above, it is therefore the technical problem underlying the present invention to provide a gateway server for making SOAP/XML-based web services accessible to RPC clients which can be easily configured while the gateway server stays available at all times and thereby at least partly overcomes the above explained disadvantages of the prior art.

3. SUMMARY OF THE INVENTION

This problem is according to one aspect of the invention solved by a gateway server system comprising a gateway server for making at least one SOAP/XML-based web service accessible to at least one RPC client in accordance with at least one mapping file, the at least one mapping file comprising definitions for translating at least one first RPC request message from the at least one RPC client to at least one web service call of the at least one SOAP/XML-based web service. In the embodiment of claim 1, the gateway server comprises:

a. a configuration interface adapted for receiving and for storing the at least one mapping file in a storage medium;
b. wherein the gateway server is adapted for creating at least one first subprogram adapted for processing the at least one first RPC request message in accordance with the at least one mapping file; and
c. wherein the configuration interface of the gateway server is further adapted for receiving at least one updated mapping file and for overwriting the corresponding at least one original mapping file stored in the storage medium without affecting the processing of the at least one first subprogram.

Accordingly, the embodiment defines a gateway server that serves as an intermediary between RPC clients and SOAP/XML-based web services. In contrast to the prior art, the gateway server of the present invention does not employ an inflexible start-up configuration. Instead, a mapping file is stored in a storage medium preferably for each SOAP/XML-based web service supported by the gateway server and the gateway server creates preferably one first subprogram for each supported web service. Each first subprogram serves for handling RPC request messages from clients that need to access the respective SOAP/XML-based web service. To this end, the at least one first subprogram preferably receives an RPC request message from the at least one client, translates the RPC request message in the RPC format to a format compatible with the corresponding SOAP/XML-based web service and submits the translated request to the SOAP/XML-based web service. After the SOAP/XML-based web service has finished its processing, the at least one first subprogram may receive a response message from the SOAP/XML-based web service, translate the response message back into the RPC format and send the translated response message back to the RPC client.

The handling of RPC request messages by subprograms is especially advantageous, since when a new mapping file is added to the gateway server, the gateway server does not have to be stopped and restarted as in the prior art. Instead, the gateway server remains running. It is to be noted that any other SOAP/XML-based web services supported by the gateway server, which are not concerned with the added mapping file, remain seamlessly available to the RPC clients. This is especially advantageous over the start-up configuration known from the prior art, where even if a configuration change only affects a certain subset of the supported web services, all other web services supported by a prior art gateway server are also inaccessible while the gateway server is stopped. It is to be noted that a downtime of the gateway server may have catastrophic consequences especially in the context of the EntireX environment, wherein an EntireX gateway server typically connects RPC clients with mission-critical SOAP/XML-based web services, which have to be available at all times under all circumstances.

Moreover, a first subprogram for each supported SOAP/XML-based web service may be created as soon as the respective mapping file is received by the configuration interface, which has the further advantage that a newly received mapping file, and consequently the corresponding SOAP/XML-based web service, can be immediately supported by the gateway server.

Furthermore, the configuration interface of the gateway server may receive updated mapping files and replace the corresponding existing mapping files within the storage medium. The replacement of a mapping file, however, has no impact on the processing of the corresponding first subprogram. In other words, a mapping file can be updated within the storage medium, while at the same time the corresponding subprogram stays available and can keep serving any ongoing RPC request messages, i.e. RPC request messages which the first subprogram has already started processing prior to the update of the mapping file. This is especially advantageous over the prior art approaches, where either the processing of an ongoing RPC request message would be corrupted by the updated mapping file, or where a mapping file could only be updated when all ongoing requests have been completely processed.

In one aspect of the present invention, the at least one first subprogram may therefore be adapted for importing, during its creation, the at least one mapping file from the storage medium and for processing the at least one first RPC request message in accordance with the at least one imported mapping file. Accordingly, the first subprogram may process the first RPC request message according to the translation definitions comprised in the mapping file as they were imported by the first subprogram when it was created by the gateway server. Thus, updating the corresponding mapping file during an ongoing processing by the first subprogram does not affect the first subprogram at all.

In another aspect, the gateway server may be adapted for creating at least one second subprogram adapted for processing at least one second RPC request message in accordance with the at least one updated mapping file. Accordingly, when a mapping file is updated within the storage medium and while the first subprogram continues to serve the first RPC request message according to the original mapping file, the present invention facilitates to immediately serve a second (i.e. new) RPC request message in accordance with the updated mapping file (by the corresponding second subprogram). This is especially advantageous, since an update to a mapping file can be immediately used by the second subprogram to process new (second) RPC request messages, while any ongoing, i.e. currently processed, (first) RPC request messages are processed in parallel (by the first subprogram) without interruption. In other words, this serves for an especially seamless serving of the RPC clients, since the gateway server is available at all times and always provides the processing of RPC request messages according to the most recent version of the mapping file.

According to a further aspect, the gateway server may be adapted for routing the at least one second RPC request message to the at least one second subprogram and for disabling the at least one first subprogram after the at least one first RPC request message has been processed by the at least one first subprogram. Accordingly, the gateway server ensures that the first subprogram (which processes RPC request messages according to the original mapping file) is not used anymore for the handling of new (second) RPC request messages. Instead any second RPC request messages are routed to the second subprogram, which already operates on the updated mapping file. This guarantees that any new RPC request messages are processed according to the most recent version of the mapping file. Disabling the first subprogram, e.g. by removing the subprogram from a processing memory of the gateway server, ensures that the gateway server is not overloaded over time. However, the first subprogram is not disabled before the ongoing (first) RPC request message has been completely processed, in order to ensure that ongoing calls from RPC clients are finished in a correct and consistent manner.

Additionally or alternatively, the gateway server may further comprise a configuration file comprising an entry pointing to the at least one first subprogram, wherein, upon creation of the at least one second subprogram, the gateway server is adapted for editing the entry to point to the at least one second subprogram. Accordingly, the gateway server may maintain a configuration file that preferably stores an entry for each first subprogram currently active, i.e. currently ready for handling RPC client requests. Whenever a second subprogram is created, the corresponding entry in the configuration file is edited to point to the new (second) subprogram.

Furthermore, the configuration interface of the gateway server may be adapted for receiving the at least one mapping file in a request message according to an RPC protocol used by the at least one RPC client. Accordingly, the configuration interface accepts messages in a format adhering to the RPC protocol which is also used by the at least one RPC client for sending RPC request messages to the gateway server. In other words, the configuration interface uses the same protocol than the RPC clients, so that no additional network port is needed for communicating with the configuration interface. This is especially advantageous, since on the one hand, the communication with the configuration interface does not require special firewall and/or other security settings, which facilitates an especially convenient accessibility of the configuration interface from remote computers, i.e. computers distinct from the gateway server. On the other hand, the security of the gateway server is not decreased at all, since no additional port is needed for this remote accessibility, which would introduce the risk of hackers breaking into the gateway server through such an additional port. It will be appreciated that, while this aspect of the invention is especially helpful in the context of the claimed gateway server within an RPC- and SOAP/XML-based environment (which typically communicates over open and insecure networks such as the internet), it could also be implemented independently in order to provide the advantage of an easy and secure remote access within any kind of computing environment.

In yet another aspect, the configuration interface of the gateway server may be adapted for determining, for each of a plurality of configuration entries comprised in the at least one mapping file, whether the respective configuration entry is in conflict to an existing configuration of the gateway server and for submitting only valid configuration entries to the gateway server. Accordingly, the gateway server maintains a number of configuration settings comprehensively called the configuration of the gateway server, which will be further described in the detailed description below. When the configuration interface receives a mapping file, it preferably checks each or part of the comprised configuration entries to determine whether the desired configuration changes are semantically consistent to the existing configuration of the gateway server, i.e. whether at least one of the configuration entries in the mapping file would violate the existing configuration of the gateway server. Examples of such validations are further explained in the detailed description below. After validating the configuration entries, the configuration interface submits only valid configuration entries to the gateway server. This has the advantage that an existing configuration of the gateway server cannot be edited in such a way that would lead to an erroneous configuration of the gateway server, which would possibly result in malfunction or severe damages of the gateway server and/or the connected further computers. It should be appreciated that this aspect, although it is especially advantageous in the context of the claimed gateway server (which preferably has to be available at all times), could be implemented in any configurable computer system in order to ensure the absence of errors in the configuration of such a computer system.

In yet another aspect, the configuration interface may be adapted for submitting the valid configuration entries to the gateway server in an optimized sequence, e.g. to guarantee the correct processing of configuration entries which have dependencies in terms of their sequence of processing. As an example, a part of the configuration may be deleted before being replaced by another configuration part. This is especially advantageous if two mapping files have an intersecting part, as will be further explained in the detailed description below. It should be appreciated that also this aspect may be implemented independently from the aspects of the invention presented above.

Furthermore, the gateway server system may further comprise a configuration utility that is adapted for validating the at least one mapping file and for submitting only valid mapping files to the configuration interface of the gateway server. Accordingly, the mapping file may be further validated before even being submitted to the configuration interface. Such a validation may e.g. comprise the prevention of unallowed and/or erroneous configuration entries which would destroy the well-formedness of the mapping file by missing brackets, adding illegal characters and/or changing the encoding of the mapping file. Further examples for such a validation can be found in the detailed description below. While the configuration utility of the present invention is especially helpful within the context of the gateway server, it could also be implemented independently in any kind of computing environment to provide the above presented advantages as well as any of the following advantageous aspects. Furthermore, it should be appreciated that the present invention is not limited to the specific validation tasks performed by the configuration utility and by the configuration interface of the gateway server (see further above). Instead the various validation tasks could be distributed over the configuration utility and/or the configuration interface in any feasible manner.

In a further aspect, the configuration utility may be adapted for submitting the at least one mapping file in a request message according to the RPC protocol used by the at least one RPC client. As already discussed above, the configuration interface may use the same communication protocol than the RPC clients, i.e. the RPC protocol. Accordingly, the configuration utility may communicate with the configuration interface over this RPC protocol.

Furthermore, the configuration utility may be located on a computer distinct from the gateway server. This has the advantage that the gateway server can be configured remotely, i.e. from the computer on which the configuration utility is located, so that an administrator does not have to be physically present at the gateway server during configuration. Furthermore, the configuration utility may also be used for communicating with more than one gateway server, as will be discussed in more detail in the detailed description below.

In yet another aspect, the configuration utility may be adapted for receiving a plurality of configuration entries from the configuration interface of the gateway server and may further comprise a graphical user interface (GUI) adapted for displaying and/or changing at least one of the plurality of configuration entries of the gateway server. Accordingly, the configuration utility may not only be used for submitting mapping files to the gateway server, but also to configure existing configuration entries of the gateway server. Preferably, a GUI is used for displaying the configuration entries, giving an administrator the ability to change all or at least some, possible predefined, configuration entries of the gateway server.

The GUI of the configuration utility may be further adapted for allowing two or more of the plurality of configuration entries to be edited before submitting the configuration entries to the configuration interface of the gateway server. This is especially advantageous, since not every single change of an individual configuration entry has to be submitted to the gateway server, possibly over a computer network such as the internet. Instead, an administrator may perform a number of configuration entry changes and then submit all of the performed changes at once to the gateway server. This aspect decreases the network load between the configuration utility and the gateway server and improves the speed of displaying and/or changing configuration entries within the configuration utility.

The present invention is further directed to a method for making at least one SOAP/XML-based web service accessible to at least one RPC client using any of the above presented gateway server systems. Lastly, the present invention also concerns a computer program comprising instructions for implementing the above method.

4. SHORT DESCRIPTION OF THE DRAWINGS

Figure 2:
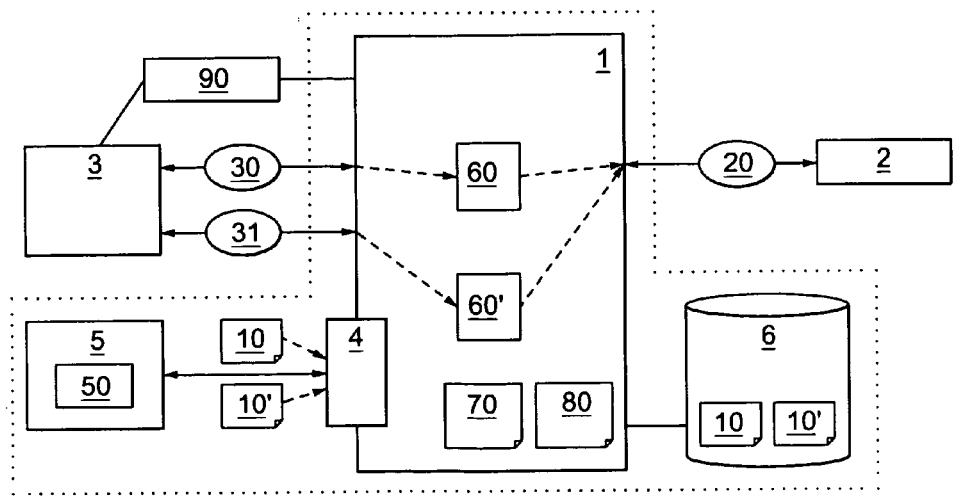
Figure 3:
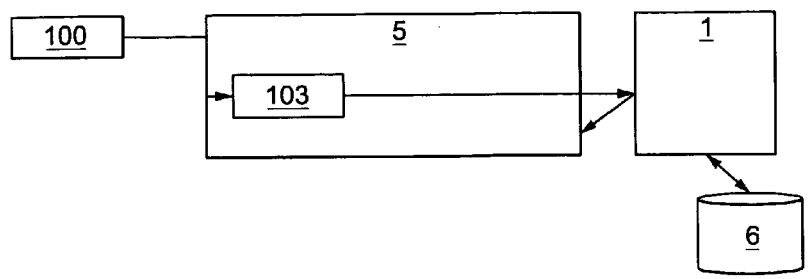
Figure 4:
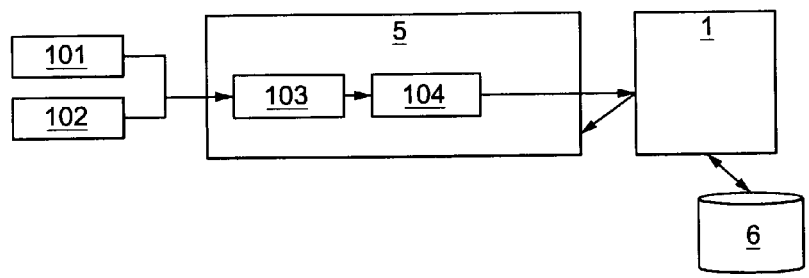
Figure 5:
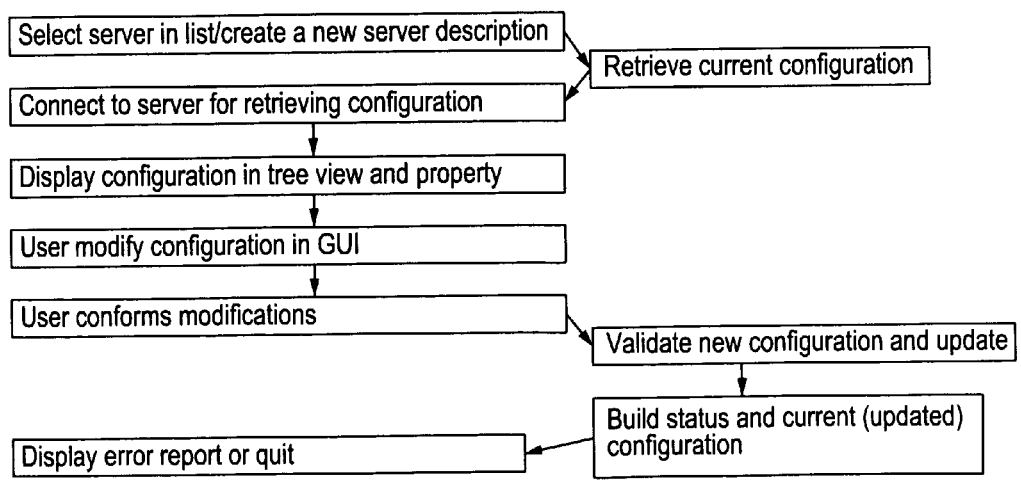
Figure 6:
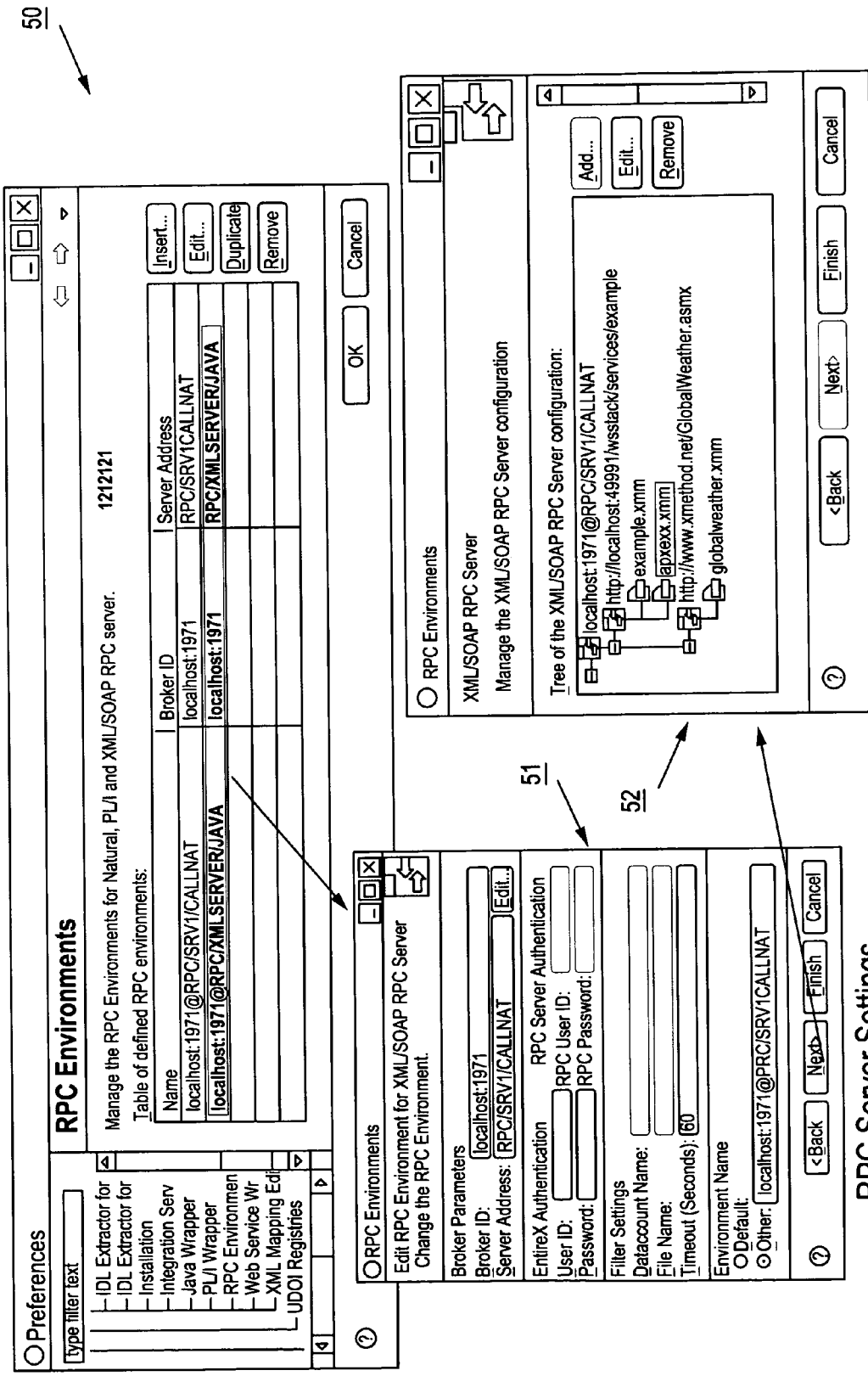
Figure 7:
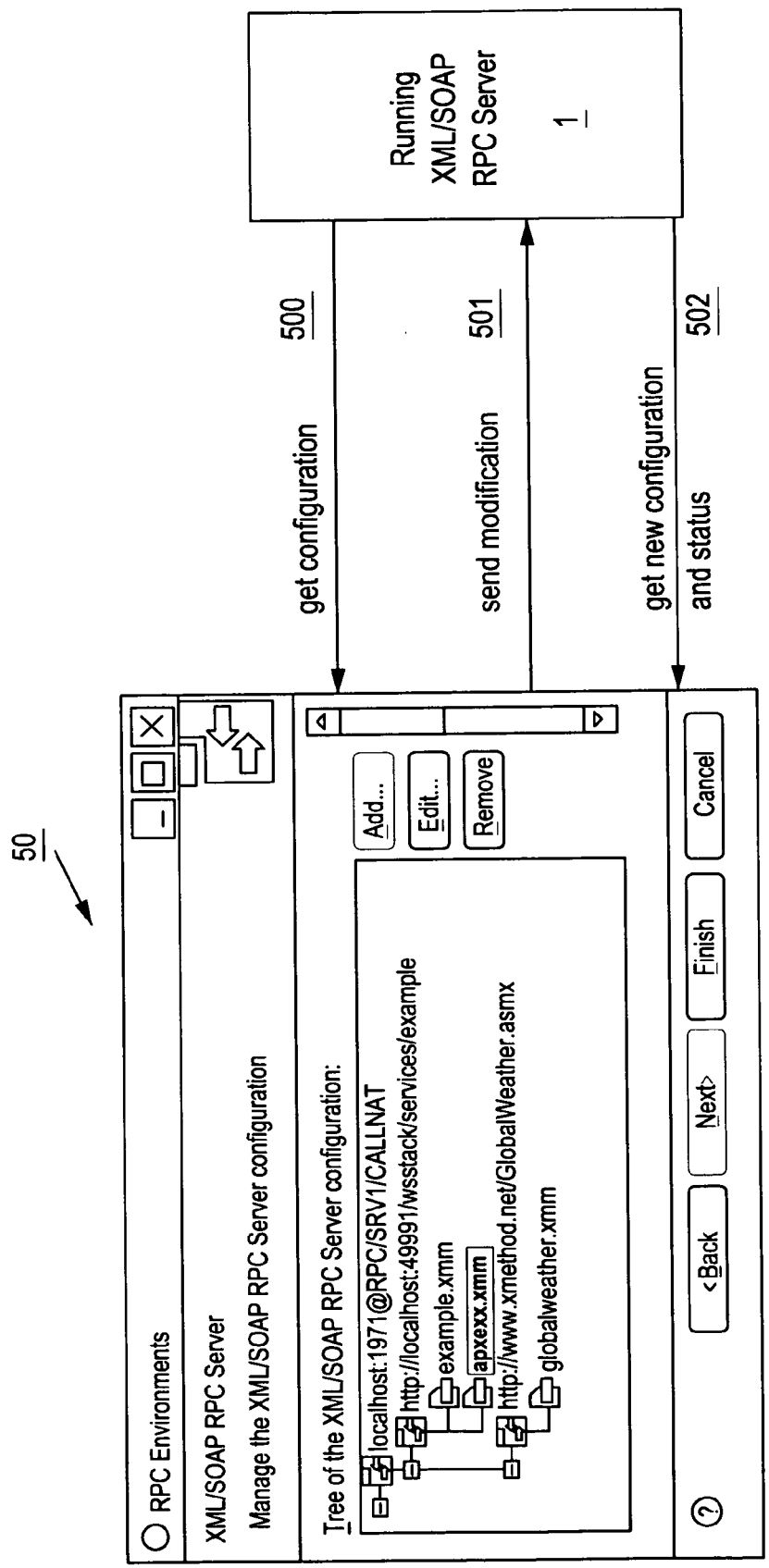

In the following detailed description, presently preferred embodiments of the invention are further described with reference to the following figures:

FIG. 1: A computing environment according to the prior art;

FIG. 2: An overview of an embodiment of a gateway server system according to the present invention;

FIG. 3: A schematic view of the deployment of a WSDL file to a gateway server according to an embodiment of the present invention;

FIG. 4: A schematic view of the deployment of an XSD file to a gateway server according to an embodiment of the present invention;

FIG. 5: A schematic view of the modification of a connection set of a gateway server according to an embodiment of the present invention;

FIG. 6: Screenshots of an exemplary graphical user interface of a configuration utility according to an embodiment of the present invention;

FIG. 7: A schematic view of the communication between a configuration utility and a gateway server according to an embodiment of the present invention; and FIG. 8: A schematic view of a direct deployment of a web service description to a gateway server according to an embodiment of the present invention.

5. DETAILED DESCRIPTION

FIG. 1 shows a typical computing environment according to the prior art. As can be seen, an EntireX XML/SOAP RPC Server connects an EntireX Broker with web services (Web Service 1, Web Service 2 and Web Service n in FIG. 1, which may include SOAP/XML-based and/or purely XML-based web services). EntireX Clients connect to the EntireX Broker. Alternatively, the EntireX Broker may also be located within the EntireX Clients. The EntireX XML/SOAP RPC Server translates calls made from the EntireX Clients to web service calls. The configuration of the EntireX XML/SOAP RPC Server is split in two files, e.g. XML files, each describing a part of the connectivity of the EntireX XML/SOAP RPC Server. A properties file defines the behaviour of the EntireX XML/SOAP RPC Server towards the EntireX Broker and a configuration file defines the behaviour of the EntireX XML/SOAP RPC Server towards the web services (which may be external and/or internal web services). Furthermore, a number of XMM files (IDL-XML-Mapping files) are provided that define how to translate an EntireX RPC message (sent from the EntireX clients) to a web service call. To this end, an XMM file contains a description of the mapping between the EntireX RPC Protocol and SOAP/XML documents. The configuration of the EntireX XML/SOAP RPC Server, i.e. any configuration settings comprised in the properties file, the configuration file and/or the XMM files, cannot be changed without restarting the EntireX XML/SOAP RPC Server. Configuration changes have to be performed by editing the text of the respective configuration file and/or properties file without any graphical or context-sensitive support.

Especially in the context of the increasing use of complex and dynamically changing web services as well as of various communication protocols currently in use, it is required to reconfigure an XML/SOAP RPC Server, such as the EntireX XML/SOAP RPC Server, in order to adapt to new or changed web services, changed communication protocols, etc.

The prior art environment depicted in FIG. 1, however, has a number of disadvantages in this context. Most importantly, the EntireX XML/SOAP RPC Server is running with start-up configuration so that new updates (e.g. new XMM files or changes to the configuration file or the properties file) cannot be integrated during runtime. Instead, the EntireX XML/SOAP RPC Server has to be stopped before the configuration change and restarted afterwards. Consequently, new web services cannot be used as long as the EntireX XML/SOAP RPC Server is running. A stopping and restarting of the EntireX XML/SOAP RPC Server, however, is not acceptable especially in production environments, because mission critical processing functionalities provided by the EntireX XML/SOAP RPC Server would not be available during downtime.

Furthermore, since the configuration of the EntireX XML/SOAP RPC Server has to be performed manually be editing various text files, errors may be easily introduced into the configuration. An erroneous configuration, however, leads to severe runtime problems, e.g. in that the web services are not accessible anymore because the EntireX XML/SOAP RPC Server does not start or in the worst case the message payload is corrupted, which may lead to severe damages of the connected systems and/or databases. Also other known prior art gateway servers require a manual editing of text files, e.g. XML files. An erroneous modification of a text file, however, may make the file unusable, e.g. by destroying the well-formed document structure by missing brackets, adding illegal characters or changing the encoding of the file. Furthermore, there is no help in finding the correct tag names required by the file format and no validation is done during development time in the prior art approaches. Generally, editing a text file on non-ASCII platforms is especially risky, since e.g. in the context of the EntireX XML/SOAP RPC Server, the properties file must adhere to the encoding 'ASCII'—JAVA specification, which may be destroyed by editing the file on a non-ASCII platform. Each of the above-described errors may easily result in problems such as that the XML/SOAP RPC Server does not start again or corrupts the message payload.

Moreover, the prior art approaches require that configuration changes are performed locally on the XML/SOAP RPC Server. In other words, an administrator has to logon to the local machine of the XML/SOAP RPC Server, in the worst case while being physical present at machine. Furthermore, the administrator has to possess in-depth knowledge about file structure on the local machine, e.g. to determine where the configuration and properties files used by the XML/SOAP RPC Server are located. Lastly, various manual and error-prone tasks have to be performed, e.g. copying XMM and/or WSDL (Web Service Description Language) files to the local machine and modifying the configuration and property files on the local machine.

The present invention therefore provides a gateway server system that overcomes at least part of the above-presented disadvantages of the prior art. In the following, a presently preferred embodiment of the invention is described with respect to a gateway server system as schematically shown in FIG. 2. As can be seen, the gateway server system (represented by the dotted line in FIG. 2) comprises a gateway server 1 that serves for connecting RPC clients 3 to SOAP/XML-based web services 2. It should be appreciated that FIG. 2 only depicts a simple scenario, but that the claimed gateway server 1 is capable of connecting a plurality of RPC clients 3 with SOAP/XML-based web services 2. In the exemplary scenario of FIG. 2, the RPC client 3, wanting to access the exemplary SOAP/XML-based web service 2, sends one or more RPC request messages 30 to the gateway server 1. The gateway server 1 translates the RPC request message 30 into one or more web service calls 20. The translation is performed based on a mapping file 10, such as an XMM file 10. The gateway server 1 then sends the generated web service call 20 to the SOAP/XML-based web service 2. It will be appreciated that also the communication in the reverse direction is facilitated by the gateway server 1 (not explicitly depicted in FIG. 2, but indicated by the double headed arrows). To this end, the gateway server 1 may receive a response message from the SOAP/XML-based web service 2 and translate the response message back to an RPC message, which is then sent back to the RPC client 3.

In the following, various advantageous aspects of the present invention are described in more detail. It should be appreciated that some or all of these aspects may be implemented within the gateway server system of FIG. 2. Alternatively, aspects of the present invention may also be implemented independently from each other, as will be further explained below.

Runtime Configuration of the Gateway Server

In this aspect of the invention, the gateway server system provides a way for automatically deploying web service descriptions to a gateway server 1 (cf. FIG. 2) as well as for reconfiguring an existing configuration of the gateway server 1 in a dynamic manner, i.e. without affecting the availability of the gateway server 1.

As can be seen in FIG. 2, the gateway server 1 comprises a configuration interface 4 that serves for a dynamic configuration of the running gateway server 1. If, for example, a new mapping file 10 is to be deployed to the gateway server 1, the mapping file 10 is received by the configuration interface 4, which then stores the mapping file 10 in a storage medium 6 of the gateway server system. The storage medium 6 is preferably a directory running locally on the gateway server 1. However, other types of storage mediums or architectures are also supported by the present invention, e.g. a storage medium 6 external to the gateway server 1.

The gateway server 1 creates a first subprogram 60 that serves for translating RPC request messages 30 from RPC clients 3 for the web service 2 according to the mapping file 10. To this end, the mapping file 10 may, in addition to the mapping definition (i.e. the definition about how to translate between RPC request messages 30 and web service calls 20), comprise one or more program descriptions for one or more corresponding first subprograms 60. Preferably, there is a 1-to-1 relationship between mapping files 10 and first subprograms 60. However, a subprogram may also process more than one mapping file 10 and/or a mapping file 10 may be processed by more than one first subprogram 60. Furthermore, a mapping file 10 may define the translation between RPC request messages 30 to one particular web service call 20, or alternatively to a plurality of web service calls 20. The first subprogram 60 may be created as soon as the corresponding mapping file 10 is stored in the storage medium 6. Alternatively, the first subprogram 60 may be created upon request, e.g. by an administrator, or when the first RPC request message 30 for a corresponding web service 2 is received by the gateway server 1. In summary, the creation of a first subprogram 60 for handling RPC client request messages 30 enables the gateway server 1 to support new SOAP/XML-based web services 2 without having to be stopped and restarted. Moreover, a first subprogram 60 may process more than one first RPC request message 30 simultaneously.

Furthermore, not only new mapping files 10 can be received by the configuration interface 4, but also existing mapping files 10 within the storage medium can be changed. To this end, the configuration interface 4 may receive an updated mapping file 10' and subsequently overwrite the corresponding existing mapping file 10 with the updated mapping file 10'. However, in case the first subprogram 60 is currently processing an RPC request message 30 at this point in time, the processing of the first subprogram 60 is not affected at all by the overwritten mapping file 10 in the storage medium 6. In other words, the first subprogram 60 continues its processing of the RPC request message 30 according to the original mapping file 10.

In order to take advantage of the updated mapping file 10' stored within the storage medium 6, the gateway server 1 creates a second subprogram 60'. The second subprogram 60' handles new (second) RPC request messages 31, i.e. RPC request messages that arrive at the gateway server 1 after the mapping file 10 is updated with the updated mapping file 10', according to the updated mapping file 10'. It is to be noted that in this scenario, it is possible that the first subprogram 60 and the second subprogram 60' are active in parallel, wherein the first subprogram 60 handles any RPC request messages 30 that were received prior to the update of the mapping file 10 and the second subprogram 60' handles any RPC request messages 31 that were received after the update of the mapping file 10.

Since the first subprogram 60 can be considered "outdated" (since it operates on the original definitions of the mapping file 10), the first subprogram 60 is preferably disabled after all RPC request messages 30 have been processed completely. New RPC request messages 31 are exclusively handled by the second subprogram 60'. In other words, the second subprogram 60' actually replaces the first subprogram 60 in a seamless manner, so that the respective web service 2 supported by the subprograms is available at all times during the configuration change from the original mapping file 10 to the updated mapping file 10'.

Validation of Configuration Changes

In the following, a further aspect of the present invention will be described, namely that the configuration interface 4 shown in FIG. 2 accepts only the correct and consistent part of a configuration request and reconfigures the gateway server 1 with this configuration part. It is to be noted that this aspect is especially advantageous in the context of the above-described gateway server 1, which has to maintain a number of complex configuration files, properties files and/or mapping files. However, the following aspects may also be implemented independently from the other aspects of the present invention.

Configuration changes may be performed from a local and/or remote computer (with respect to the gateway server 1) and implemented during runtime. Moreover, inputs by a user or administrator are comprehensively validated before the gateway server 1 accepts the configuration data. The user is guided through the configuration and the invention validates each configuration change for semantic correctness and operation consistency. Only valid configuration data are accepted, invalid data are rejected and the gateway server 1 continues in a failsafe status with correct configuration data.

When the configuration interface 4 receives a mapping file 10 and/or any other request for a configuration change of the gateway server 1 (e.g. a change of a configuration entry in the properties file 80, the configuration file 70 and/or the mapping files 10), the configuration interface 4 performs a number of validations in order to ensure that no errors can be introduced into the configuration of the gateway server 1.

To this end, the gateway server 1 processes the desired configuration changes in an optimized sequence. This is especially advantageous, since configuration changes may imply a certain order, e.g. that a part of the gateway server configuration is deleted before it is replaced by another part. This is e.g. important if two mapping files 10 comprise a common set of configuration entries.

In one aspect, the configuration interface 4 may to this end sort the requested configuration changes in following order:
1. deletion (to minimize the possibility of intersections and/or conflicts)
2. modification of the existing configuration, e.g. changing the target web service address (i.e. changes with a low risk of conflicts)
3. addition (i.e. changes with the highest risk of conflicts)

In the following, exemplary cases are described that can be solved with an optimized sequence. In all cases, a user initiating the configuration changes may preferably pre-select the desired configuration changes and finally commit the changes, i.e. all configuration changes are processed as one unit after being selected:

Adding at least one new mapping file having an intersection with a mapping file in the active configuration and deleting any conflicting mapping file(s).

Adding at least one new mapping file having an intersection with a mapping file in the active configuration and making an update on any conflicting mapping file(s).

Updating at least one mapping file having an intersection with another mapping file in the active configuration and deleting any conflicting mapping file(s).

Updating at least one mapping file having an intersection with another mapping file in the active configuration and making an update on any conflicting mapping file(s) to resolve the conflict.

The following shows a concrete example: An exemplary mapping file 'Mapping1.xmm' comprises two program descriptions 'CALC' and 'POWER', i.e. definitions of corresponding first subprograms 60 for handling RPC client request messages 30. An exemplary mapping file 'Mapping2.xmm' comprises program descriptions 'NEWCALC' and 'POWER' for handling RPC client request messages 30. Furthermore, an exemplary mapping file 'Mapping3.xmm' comprises program descriptions 'NEWBIE' and 'CALC' for handling RPC client request messages 30. In the above example, the intersection of both mappings is the description of 'POWER' and 'CALC'.

'Mapping1.xmm' is in this example part of the current gateway server configuration and is supposed to be replaced by 'Mapping2.xmm' and 'Mapping3.xmm'. To this end, a user may, within the configuration utility 5, add the 'Mapping2.xmm' and 'Mapping3.xmm' files to the configuration and may delete the 'Mapping1.xmm' file (or in another arbitrary sequence). Finally, the user may commit the changes (e.g. by pressing an OK button). The configuration interface 4 then analyses the requested configuration. Firstly, the deletion of 'Mapping1.xmm' is processed, so that the program descriptions 'CALC' and 'POWER' are disabled and removed. Subsequently, 'Mapping2.xmm' is checked for conflicts to the remaining, i.e. current configuration. If there is no conflict, as in the above example, the configuration interface 4 accepts and enables the configuration change, so that the program descriptions 'NEWCALC' and 'POWER' are available for RPC requests. The same step is repeated for Mapping3.xmm. In the above example, the configuration change will be accepted and enabled, since there is no conflict between the program descriptions 'NEWCALC' and 'POWER'.

Furthermore, the configuration utility 5 (comprising the graphical user interface 50), the configuration interface 4 and/or the gateway server 1 is adapted for validating whether the desired configuration changes are semantically consistent in view of the overall configuration of the gateway server 1.

Semantic consistence checks may be performed on different levels, e.g.:
Parameter values: Timeout values must be zero or greater, settings for the communication with the EntireX Broker must fulfil a certain data format such as a length restriction of a user ID and password.
Consistence between selected mapping file and WSDL file: the mapping file and the WSDL file must describe the same web service and/or the number of program descriptions in the mapping file must be equal or smaller than number of operations in the WSDL file.
If more than one mapping file is added to the configuration, it must be guaranteed that there is no intersection in the program descriptions for the RPC clients.

Moreover, the configuration interface 4 is adapted for submitting the valid configuration changes to the gateway server 1 and for rejecting any invalid configuration changes. Rejected configuration changes may be returned with or without a description why the configuration change was rejected. Moreover, the configuration interface may also return a list of valid configuration changes together with or without corresponding descriptions.

Configuration Utility

The invention further provides a configuration utility 5 (cf. FIG. 2) that preferably comprises a graphical user interface (GUI) 50 to configure the gateway server 1 in a persistent and safe way in order to avoid conflicting configuration settings. Also this configuration utility 5 may be implemented independently from the above-presented aspects if the present invention. The configuration utility 5 enables an administrator to manage configurations of one or more local as well as remote gateway servers 1. The functionality of the configuration tool 5 is independent of the platforms on which the one or more gateway servers 1 run. Furthermore, the configuration utility 5 guarantees that all information needed for configuration changes, e.g. configuration descriptions required to connect to a SOAP and/or XML based web service, new XMM files with or without WSDL files, is sent to the gateway server 1. It should be noted that the configuration utility 5 and/or the gateway server 1 does not deploy web services 2 itself, but rather descriptions about how the gateway server 1 may access the web services 2. The GUI 50 of the configuration utility 5 may e.g. be realized as an Eclipse plug-in. A list of known gateway servers 1 may be stored e.g. in the plug-in context, thereby avoiding the need of an additional database. The list may comprise an entry 103 for each connected gateway server 1 that serves as a logical name for the gateway server 1.

The communication between the configuration utility 5 and the configuration interface 4 of the one or more gateway servers 1 is in one embodiment realized with an RPC protocol, such as the EntireX RPC protocol. This has the advantage that no additional port is needed on the gateway server 1 for administration tasks, i.e. for accessing the gateway server 1 during configuration. The communication therefore does not require special firewall settings on the gateway server 1 and/or on remote machines to enable a configuration over a special port.

The GUI 50 allows managing the gateway server's configuration and provides a safe and consistent way for a user and/or administrator to edit a configuration without detailed information about keywords and document formats as well as a consistency check for avoiding conflicting configurations. To modify the configuration, only the knowledge of a logical name of the gateway server 1, i.e. the list entry 103 corresponding to the gateway server 1, is required instead of its physical location and/or directory structure. The checked configuration change will preferably be active immediately, as already described above.

Furthermore, also the configuration utility 5 and/or its GUI 50 may perform a number of validations of desired configuration changes. The GUI 50 may e.g. support adequate user interface elements, such as drop down lists, checkboxes, etc., in order to restrict configuration entries to be changed only within a set of predefined options. Furthermore, files preferably cannot be used twice (although overwriting may be supported). In case a WSDL file is to be deployed to the gateway server 1 (see further below), the interrelating values, such as protocol version, service, port, etc. may be adjusted accordingly. To this end, the WSDL file to be deployed may comprise information about the available protocols (such as SOAP 1.1, SOAP 1.2 and/or HTTP), as well as information about the corresponding service and/or port settings. This information may be read from the WSDL file by the configuration utility 5 (and/or its GUI 50, respectively) and displayed within the GUI 50, preferably in a corresponding user interface element such as a combo-box or drop-down list. Furthermore, the configuration utility 5 may be adapted for pre-selecting one of the available protocols, e.g. SOAP 1.1 and to also pre-select the corresponding service and/or port settings within the GUI 50. For example, a target address of the respective service, a port number and/or the first available service may be pre-selected. In case the WSDL file does not comprise information about the SOAP 1.1 protocol, the configuration utility 5 may proceed as described above for the SOAP 1.2 protocol. In case the WSDL file does also not comprise information about SOAP 1.2, the configuration utility 5 may proceed as described above for the HTTP protocol.

In case an XMM file is to be deployed together with a WSDL file (see further below), only the relevant data may be displayed and/or submitted, thereby avoiding communicating the whole file from/to the gateway server 1. The capability of dynamic deployment of configuration changes of the gateway server 1 (see above) is preferred in this context. Otherwise, the configuration changes would be not visible immediately.

The GUI 50 of the configuration utility 5 may support two different kinds of user interfaces. A GUI implemented as a wizard driven graphical user interface may allow a "quick adding" of an XMM file 10 to the gateway server 1. To this end, the quick adding functionality may be initiated by selecting a WSDL file, XSD (XML Schema Definition) file and/or XMM file. Examples of the above-described "quick add" functionality are described in more detail in the exemplary usage scenarios below.

Additionally or alternatively, The GUI 50 may provide a preference page representing the current configuration of the gateway server 1. It is to be noted that the GUI 50 may provide a plurality of preference pages in case more than one gateway server 1 is connected to the configuration utility 5. A user and/or administrator may make configuration changes (wherein a sequence of configuration changes may be allowed) in a tree view and a properties pane of the GUI 50. After applying the (sequence of) configuration change(s), e.g. by pressing an "OK" button, the new configuration is sent to the gateway server 1. The gateway server 1 validates the new configuration and updates its configuration accordingly (as already explained further above). A status report of performed and/or rejected configuration changes may be sent back as acknowledgement. Further examples of the above-described "preference page" functionality are described in more detail in the following exemplary usage scenarios.

Exemplary Usage Scenarios

Scenario 1: Deploying a WSDL File to the Gateway Server

The following usage scenario is an example of the "quick add" functionality of the gateway server system of the present invention for adding a WSDL file to the gateway server 1.

As can be seen in FIG. 3, an extractor utility, such as the EntireX IDL Extractor for WSDL 100, first loads the WSDL file from a remote or local web server and/or from a file system and generates a corresponding XMM file for the gateway server 1. The EntireX IDL Extractor for WSDL 100 allows deploying the XMM file 10 to the gateway server 1 in a way that the WSDL file and the XMM file 10 are deployed to a selected running gateway server 1. To this end, the deployment call may be performed via the EntireX Broker to the gateway server 1, so that the storage medium 6 (cf. FIG. 2) is updated accordingly, as already described further above for making the successful changes persistent. The gateway server 1 replies with a status report displayed on the configuration utility 5 if there is any error.

From an end user perspective, the interaction only requires to select a WSDL file to be imported and to select a target gateway server 103 within the configuration utility 5 (e.g. implemented as an Eclipse plug-in). As already explained further above, the configuration utility 5 may therefore maintain a list f connected gateway servers 1, wherein each connected gateway server 1 may be represented as a list entry 103. The selection of the WSDL service, port, location of the web service and/or further configuration settings may be performed automatically. Alternatively, the configuration settings but may also be changed manually the by user (cf. scenario 4 further below), wherein the configuration utility 5 preferably prevents unallowed configuration changes, as already described further above.

Scenario 2: Deploying an XSD File to the Gateway Server

The following usage scenario is an example of the "quick add" functionality of the gateway server system of the present invention for adding an XSD file to the gateway server 1.

As can be seen in FIG. 4, an extractor utility, such as the EntireX IDL Extractor for XML Schema 101, loads the XSD file from a remote or local web server and/or from a file system and generates a corresponding XMM file. The EntireX IDL Extractor for XML Schema 101 allows deployment to the gateway server 1 in a way that the XMM file is deployed to a selected running gateway server 1.

The deployment call is performed in a manner similar to scenario 1 above. After the deployment, the XSD file is no longer used or required in context of the gateway server 1.

From an end user perspective, the interaction only requires to select an XSD file 101 and to select a target gateway server 103 (similar to scenario 1 above) as well as the target service address 104 within the configuration utility 5. The gateway server 1 then updates the storage medium 6 for making successful changes persistent. The gateway server 1 may reply with a status report displayed on the configuration utility 5 if there is any error.

Scenario 3: Deploying an XMM File to the Gateway Server

The following usage scenario is an example of the "quick add" functionality of the gateway server system of the present invention for adding an XMM file to the gateway server 1.

Figure 8:
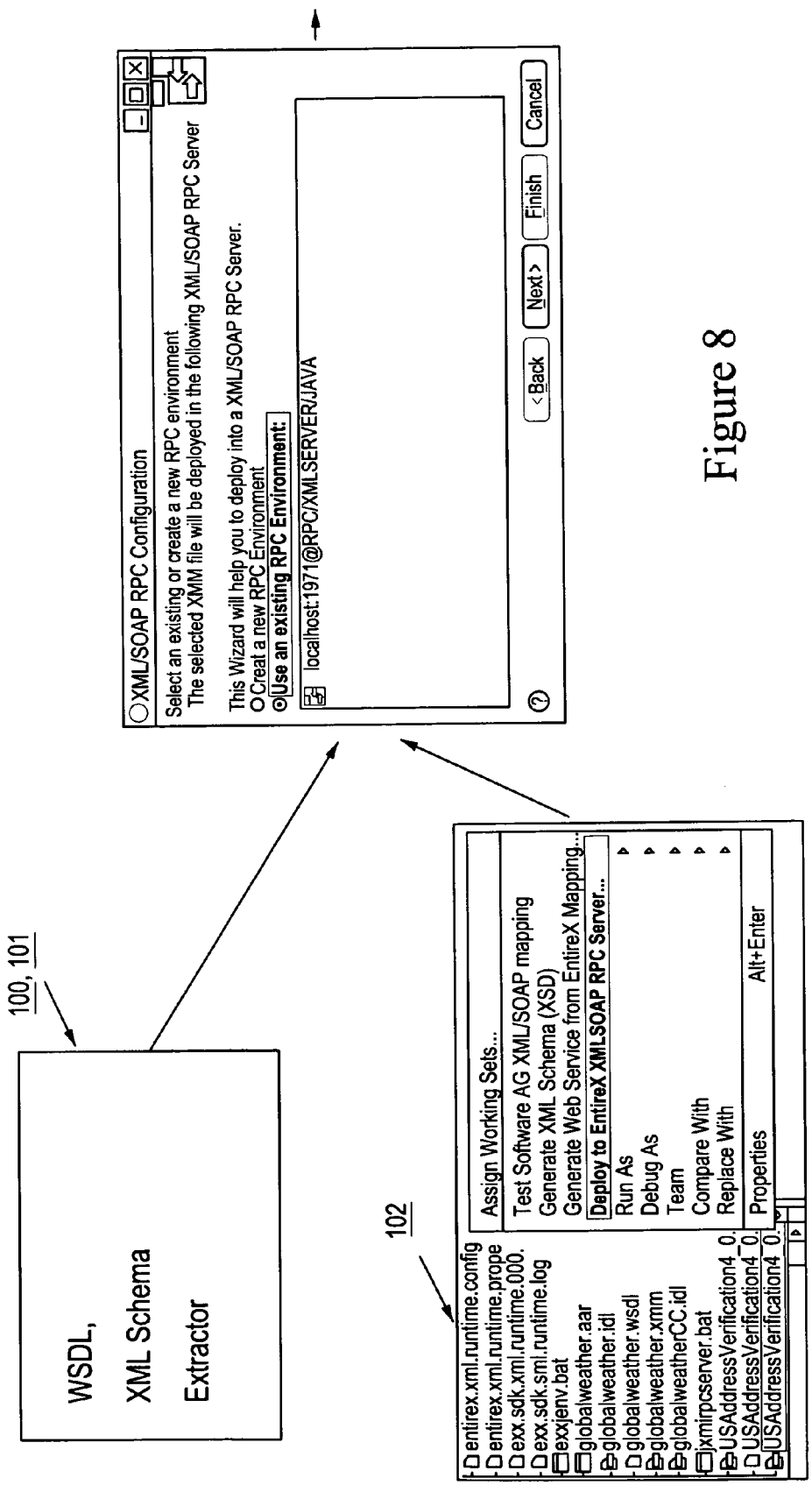

Each XMM (IDL-XML-Mapping) file to be deployed may be selected in the configuration utility 5, preferably within an Eclipse Workspace 102 (cf. FIG. 4) and deployed directly to the gateway server 1 via a context menu (cf. FIG. 8). To process the deployment, the user may select the desired gateway server entry 103 and enter an address, such as an URL, identifying the target web service 104. The deployment call is performed in a similar manner to scenario 1 and 2. The gateway server 1 updates the storage medium 6 for making successful changes persistent. The gateway server 1 may reply with a status report displayed on the configuration utility 5 if there is any error.

Scenario 4: Modify a Connection Set of the Gateway Server

The following usage scenario is an example of the "preference page" functionality of the gateway server system of the present invention. The configuration utility 5 (preferably in the form of an Eclipse plug-in) provides via a preference page the ability to modify the connections of the gateway server 1 to the web services 2.

As already described further above, the configuration utility 5 may be used to connect to and configure one or more gateway servers 1. To this end, all connected gateway servers 1 may be offered in a graphical list element (cf. the uppermost window in FIG. 6, where two exemplary gateway servers 1 are listed, i.e. represented by corresponding gateway server entries 103). The user may delete a certain gateway server entry 103 from the list. After selecting a gateway server entry 103 in the list (preferably stored in the Eclipse plug-in context) and/or after creating a new connection to a gateway server 1 (by adding a new gateway server entry 103), the respective configuration is loaded (see the step 500 in FIG. 7) from the selected gateway server 1 and is displayed in the GUI 50 of the configuration utility 5. The configuration is preferably displayed in two pages; a first page 51 shows the EntireX setting (i.e. it represents the properties file 80 of the respective gateway server 1; cf. the left-hand window 51 in FIG. 6) and a second page 52 shows the connection to the web services 2 (i.e. representing the configuration file 70 of the respective gateway server 1; cf. the right-hand window 52 in FIG. 6).

The GUI 50 may provide in a tree view all established web service connections, preferably comprising information of the respective XMM files 10 (cf. the right-hand window 52 in FIG. 6). More detailed information about a selected web service connection and/or the corresponding XMM file may be shown in an additional GUI element on the same page. The GUI elements may support context menus and "drag&drop" functionality where possible. Validation checks are made on all elements where validation is possible. FIG. 5 shows a flowchart of actions that may be performed using the above-described "preference page" functionality. After a user or administrator applies the configuration changes, e.g. by pressing an "OK" button, the changed configuration is sent from the configuration utility back to the gateway server 1 (cf. step 501 in FIG. 7). After the gateway server 1 has validated and processed the configuration changes, the new configuration of the gateway server 1 may be again received by the configuration utility 5 (cf. step 502 in FIG. 7).

Furthermore, the configuration utility 5 may provide an import functionality to retrieve the complete configuration information including all files as an archive. The archive may be stored in a local storage and may be deployed via an export functionality directly to further gateway server, e.g. for moving and/or copying a development environment to a production environment.

The following operations may be performed within the page displaying the web service connection information, which is available after selecting a gateway server 1 by name (i.e. by its logical name 103):

Add a new targeted web service address directly. After the user has submitted the desired configuration changes (e.g. by pressing the "OK" button), only a placeholder for the web service address may be written to the configuration file of the gateway server. This aspect has no effect on the runtime behaviour, since no mapping is associated for this address.

Add an XMM file 10 to the gateway server configuration. If a new web service 2 is addressed, the required entries (i.e. new target URL) may be added automatically. Accordingly, after the user has submitted the desired configuration changes (e.g. by pressing the "OK" button), the new mapping may be appended to an existing or created target web service address. The configuration file may be updated and the XMM file may be stored on the gateway server. The RPC client may access programs defined in this mapping file immediately.

Add a WSDL to XMM setting and support setting of WSDL—a default setting depending on preferred version of SOAP protocol of XML/SOAP RPC Server may be preselected. Accordingly, after the user has submitted the desired configuration changes (e.g. by pressing the "OK" button), the association of an XMM file with a WSDL file may result in the reconfiguration of the web service access. The mapping may have been unchanged, but the target web service may have changed. The configuration file may therefore be updated and the WSDL file may be stored on the gateway server. In conclusion, an RPC request may be directed to another web service if the web service address has changed and/or the used protocol has changed (e.g. to SOAP 1.2).

Modify any setting of a targeted web service, e.g. credentials for HTTP basic authentication. Accordingly, after the user has submitted the desired configuration changes (e.g. by pressing the "OK" button), the mapping file and the target web service may have been unchanged. Therefore, the next call processing may use HTTP Basic Authentication, if corresponding credentials are set and/or the call may wait longer for a response if a corresponding timeout value is increased. The configuration file may be updated accordingly.

Modify any setting (i.e. configuration entry) of an XMM file, e.g. a preferred version of the SOAP protocol (e.g. SOAP 1.1, SOAP 1.2, etc.). Accordingly, after the user has submitted the desired configuration changes (e.g. by pressing the "OK" button), the web service may be upgraded to the modified setting (e.g. to SOAP 1.2 protocol). The preferred version may be adapted accordingly immediately. Moreover, the configuration file may be updated accordingly.

Remove a WSDL file from XMM setting. Accordingly, after the user has submitted the desired configuration changes (e.g. by pressing the "OK" button), the WSDL file entries in the configuration may be removed and the configuration file may be updated. The availability of associated programs is not affected.

Remove an XMM file including the associated WSDL file from a target web service. Accordingly, after the user has submitted the desired configuration changes (e.g. by pressing the "OK" button), the subprograms associated with the XMM file may not be available anymore. Therefore, the configuration file may be updated accordingly.

Remove a target web service including all XMM/WSDL files associated with this web service. Accordingly, after the user has submitted the desired configuration changes (e.g. by pressing the "OK" button), the subprograms associated with the XMM file(s) may not be available anymore. Therefore, the configuration file may be updated accordingly.

Split a target web service if any relevant settings within an XMM selection is done avoiding that change affects other XMM files listed under this web service tree node. But do not spilt if target web service is selected then all changes associated with XMM files displayed as sub-nodes of target web service. Accordingly, if changes to an XMM file level affect the previous target web service address (e.g. by changing address or adding/updating WSDL file), a new target address may be created without effects for other XMM file(s) associated with previous target web service addresses.

The following operations may be allowed in the page displaying the gateway server configuration for the EntireX Broker connection (i.e. the properties file 80):

Authentication settings used for communication to the gateway server 1

Timeout settings for the EntireX Broker connection

The gateway server 1 may reply with an error status and a list of informational messages, warnings and/or errors about requested configuration changes. Erroneous configuration changes are refused by the gateway server 1 in order to avoid any conflicts with the running gateway server 1. The replied information may be used to highlight the critical parts in the tree view and to update the performed configuration issues.

All accepted changes to the configuration are made persistent through rewriting configuration files and/or XMM/WSDL files the storage medium 6 and/or to a local file system of the gateway server 1.

The invention claimed is:

1. A gateway server system comprising a gateway server for making at least one SOAP and/or XML based web service accessible to at least one RPC client in accordance with at least one mapping file, the at least one mapping file comprising definitions for translating at least one first RPC request message from the at least one RPC client to at least one web service call of the at least one SOAP and/or XML based web service, the gateway server comprising:

a configuration interface configured to receive and store, during runtime, the at least one mapping file in a storage medium;

wherein the gateway server is configured, during runtime, to create at least one first subprogram, the at least one first subprogram being configured to process the at least one first RPC request message in accordance with the at least one mapping file;

wherein the configuration interface of the gateway server is further configured, during runtime, to receive at least one updated mapping file and to overwrite the corresponding at least one original mapping file stored in the storage medium without affecting the processing of the at least one first subprogram;

wherein the gateway server is further configured, during runtime, to create at least one second subprogram, the at least one second subprogram being configured to process at least one second RPC request message in accordance with the at least one updated mapping file; and wherein the gateway server is further configured, during runtime, to route the at least one second RPC request message to the at least one second subprogram and to disable the at least one first subprogram after the at least one first RPC request message has been processed by the at least one first subprogram.

2. The gateway server system of claim 1, wherein the at least one first subprogram is configured to import, during its creation, the at least one mapping file from the storage medium and to process the at least one first RPC request message in accordance with the at least one imported mapping file.

3. The gateway server system of claim 1, wherein the gateway server further comprises a configuration file comprising an entry pointing to the at least one first subprogram, and wherein, upon creation of the at least one second subprogram, the gateway server is configured to edit the entry to point to the at least one second subprogram.

4. The gateway server system of claim 1, wherein the configuration interface of the gateway server is configured to receive the at least one mapping file in a request message according to an RPC protocol used by the at least one RPC client.

5. The gateway server system of claim 1, wherein the configuration interface of the gateway server is configured to determine, for each of a plurality of configuration entries comprised in the at least one mapping file, whether the respective configuration entry is in conflict with an existing configuration of the gateway server and to submit only valid configuration entries to the gateway server.

6. The gateway server system of claim 5, wherein the configuration interface of the gateway server is configured to submit the valid configuration entries to the gateway server in an optimized sequence.

7. The gateway server system of claim 1, further comprising a configuration utility, wherein the configuration utility is configured to validate the at least one mapping file and to submit only valid mapping files to the configuration interface of the gateway server.

8. The gateway server system of claim 7, wherein the configuration utility is configured to submit the at least one mapping file in a request message according to the RPC protocol used by the at least one RPC client.

9. The gateway server system of claim 7, wherein the configuration utility is located on a computer distinct from the gateway server.

10. The gateway server system of claim 7, wherein the configuration utility is configured to receive a plurality of configuration entries from the configuration interface of the gateway server and further comprising a graphical user interface (GUI) configured to display and/or change at least one of the plurality of configuration entries of the gateway server.

11. The gateway server system claim 10, wherein the GUI of the configuration utility is configured to allow two or more of the plurality of configuration entries to be edited before submitting the configuration entries to the configuration interface of the gateway server.

12. A method for making at least one SOAP and/or XML based web service accessible to at least one RPC client using a gateway server system comprising a gateway server and in accordance with at least one mapping file, the at least one mapping file comprising definitions for translating at least one first RPC request message from the at least one RPC client to at least one web service call of the at least one SOAP and/or XML based web service, the method comprising, during runtime:

receiving the at least one mapping file, and storing the at least one mapping file in a storage medium;

creating at least one first subprogram configured to process the at least one first RPC request message in accordance with the at least one mapping file;

receiving at least one updated mapping file and overwriting the corresponding at least one original mapping file stored in the storage medium without affecting the processing of the at least one first subprogram;

creating at least one second subprogram configured to process at least one second RPC request message in accordance with the at least one updated mapping file; and routing the at least one second RPC request message to the at least one second subprogram and disabling the at least one first subprogram after the at least one first RPC request message has been processed by the at least one first subprogram.

13. A non-transitory computer readable storage medium tangibly storing a computer program comprising instructions that make at least one SOAP and/or XML based web service accessible to at least one RPC client using a gateway server system comprising a gateway server and in accordance with at least one mapping file, the at least one mapping file comprising definitions for translating at least one first RPC request message from the at least one RPC client to at least one web service call of the at least one SOAP and/or XML based web service, the instructions causing the gateway server system, during runtime, to at least:

receive the at least one mapping file, and store the at least one mapping file in a storage medium;

create at least one first subprogram configured to process the at least one first RPC request message in accordance with the at least one mapping file;

receive at least one updated mapping file and overwrite the corresponding at least one original mapping file stored in the storage medium without affecting the processing of the at least one first subprogram;

create at least one second subprogram configured to process at least one second RPC request message in accordance with the at least one updated mapping file; and route the at least one second RPC request message to the at least one second subprogram and disable the at least one first subprogram after the at least one first RPC request message has been processed by the at least one first subprogram.

14. A gateway server system comprising a gateway server configured to make a plurality of web services accessible to at least one client, each of said web services having associated therewith a respective mapping file comprising instructions for translating request messages from the at least one client to a web service call for that web service, a configuration interface configured to receive and store the mapping files in a storage medium, wherein:

the gateway server is configured, during runtime, to create a first subprogram for each said web service, each said first subprogram being configured to process first request messages from the at least one client in accordance with the mapping file associated with the web service for which that first subprogram was created;

the configuration interface is further configured, during runtime, to receive updated mapping files and to store any such received updated mapping files to the storage medium;

the gateway server is further configured, during runtime, to create second subprograms for any updated mapping files received by the configuration interface and stored to the storage medium by the configuration interface, the second subprograms being configured to process second request messages from the at least one client in accordance with the updated mapping files associated with the web service for which that second subprogram was created, the second request messages being all request messages for that web service received after creation of the associated second subprogram; and the gateway server is further configured, during runtime, to process first and second request messages using the first and second subprograms, respectively and in parallel, for a given web service, in order to allow the first subprogram to finish processing the first request messages it is handling before the gateway server disables it.

15. The gateway server system of claim 14, wherein the at least one client is an RPC client and the web services are SOAP and/or XML based.

16. The gateway server system of claim 15, wherein the configuration interface uses the same protocol as the RPC clients, so that no additional network ports are needed for communications therebetween.

17. A method of configuring a gateway server in a gateway server system in order to enable the gateway server to make a plurality of web services accessible to at least one client in the system, the method comprising, during runtime:

for each said web service, receiving a corresponding mapping file comprising instructions for translating request messages from the at least one client to a web service call for that web service;

creating, for each said web service, a first subprogram configured to process request messages from the at least one client in accordance with the corresponding mapping file;

processing request messages using the first subprograms;

receiving one or more updated mapping files for one or more respective web services;

for each web service for which an updated mapping file is received, creating a second subprogram configured to process subsequently received request messages from the at least one client for that web service in accordance with the updated mapping file; and when a second subprogram is created for a given web service:

enabling the first and second subprograms for that web service to operate in parallel while the first subprogram is still processing requests, and when the first subprogram has finished processing all of requests that it has to process, disabling the first subprogram.

* * * * *